(12) United States Patent
Brendel et al.

(10) Patent No.: US 9,580,270 B2
(45) Date of Patent: Feb. 28, 2017

(54) WINDING FIXING DEVICE

(71) Applicant: ABB TECHNOLOGY AG, Zürich (CH)

(72) Inventors: Hartmut Brendel, Halle (DE); Jutta Schmidt, Magdeburg (DE); Sebastian Schreiter, Leipzig (DE); Oleg Kouzmine, Düsseldorf (DE); Peter Werle, Walsrode (DE)

(73) Assignee: ABB Schweiz AG, Baden (CH)

( * ) Notice: Subject to any disclaimer, the term of this patent is extended or adjusted under 35 U.S.C. 154(b) by 357 days.

(21) Appl. No.: 14/077,872

(22) Filed: Nov. 12, 2013

(65) Prior Publication Data

US 2014/0151492 A1    Jun. 5, 2014

Related U.S. Application Data

(63) Continuation of application No. PCT/EP2012/001086, filed on Mar. 10, 2012.

(30) Foreign Application Priority Data

May 12, 2011    (EP) .................................... 11003901

(51) Int. Cl.
*B23P 19/00*    (2006.01)
*H05K 13/04*    (2006.01)
(Continued)

(52) U.S. Cl.
CPC .............. *B65H 75/26* (2013.01); *B23P 19/04* (2013.01); *H01F 27/004* (2013.01); *H01F 27/306* (2013.01); *Y10T 29/49826* (2015.01)

(58) Field of Classification Search
CPC ....... B65H 75/26; B23P 19/04; H01F 27/004; H01F 27/306; Y10T 29/49009;
(Continued)

(56) References Cited

U.S. PATENT DOCUMENTS 2,466,448 A * 4/1949 Lentz .............................. 336/197
3,381,252 A * 4/1968 Lutz ............................... 336/197
(Continued)

FOREIGN PATENT DOCUMENTS

DE    30 27 883 A1    2/1981
EP    2 355 115 A1    8/2011
(Continued)

OTHER PUBLICATIONS

International Search Report (PCT/ISA/210) mailed on Apr. 17, 2012, by the European Patent Office as the International Searching Authority for International Application No. PCT/EP2012/001086.

*Primary Examiner* — Paul D Kim
(74) *Attorney, Agent, or Firm* — Barnes & Thornburg LLP

(57) ABSTRACT

A winding fixing device and method for a hollow-cylindrical high-voltage winding are disclosed, wherein the winding fixing device includes a pillar-like element having two axial ends, each of the two axial ends being configured to be connected to a respective retaining element which is arranged transversely with respect thereto. Each of the retaining elements is configured to be movable along the pillar-like element and detachable therefrom. A positioning region for arranging a hollow-cylindrical high-voltage winding is formed between the retaining elements, and spacing elements are configured to move axially along the pillar-like element. The spacing elements are configured to radially fix the hollow-cylindrical high-voltage winding when placed between the retaining elements by applying a tensile force to the retaining elements.

12 Claims, 3 Drawing Sheets

(51) Int. Cl.
*B65H 75/26* (2006.01)
*H01F 27/00* (2006.01)
*H01F 27/30* (2006.01)
*B23P 19/04* (2006.01)

(58) Field of Classification Search
CPC .......... Y10T 29/4902; Y10T 29/49073; Y10T 29/49826; Y10T 29/5313; Y10T 29/53174; Y10T 29/53265
USPC ................ 29/602.1, 605, 606; 333/222, 223
See application file for complete search history.

(56) References Cited

U.S. PATENT DOCUMENTS

| | | | | |
|---|---|---|---|---|
| 3,796,333 | A | * | 3/1974 | Goldstein ................ B60D 1/52 224/509 |
| 4,404,740 | A | | 9/1983 | Hägg et al. |
| 6,568,322 | B2 | * | 5/2003 | Gottling et al. ............. 101/216 |
| 8,393,659 | B2 | * | 3/2013 | Stroh ........................... 294/67.3 |
| 2008/0290981 | A1 | * | 11/2008 | Bischoff et al. .............. 336/208 |

FOREIGN PATENT DOCUMENTS

| | | |
|---|---|---|
| JP | 59-14623 A | 1/1984 |
| JP | 102 50 957 B3 | 8/2004 |
| JP | 2009-49276 A | 3/2009 |

* cited by examiner

WINDING FIXING DEVICE

RELATED APPLICATION(S)

This application claims priority as a continuation application under 35 U.S.C. §120 to PCT/EP2012/001086, which was filed as an International Application on Mar. 10, 2012, designating the U.S., and which claims priority to European Application 11003901.3 filed in Europe on May 12, 2011. The entire contents of these applications are hereby incorporated by reference in their entireties.

FIELD

The disclosure relates to a winding fixing device for a hollow-cylindrical high-voltage winding, including a pillar-like element which is connected at each of its two axial ends to a retaining element, which is arranged transversely with respect thereto, and wherein at least one of the retaining elements can be moved along the pillar-like element and detached therefrom, wherein a positioning region for arranging the hollow-cylindrical high-voltage winding is formed between the two retaining elements.

BACKGROUND INFORMATION

It is known that in energy distribution networks, high-voltage transformers can be used to carry out voltage transformation from a maximum voltage level, for example 380 kV, to a relatively low voltage level, for example 110 kV. Such transformers can have a rated power in a range from, for example, 50 MVA to several 100 MVA and can have, depending on their power, a weight of, for example, 200 t. Transformers in these voltage levels can be embodied as oil transformers, for example, the transformer core and the windings which can be embodied with three phases, can be arranged in an oil-filled transformer tank whose height, without discharge line insulated, can be several meters, for example 4 m or 6 m, and its length can be above 15 m. The size of one of the three hollow-cylindrical high-voltage windings arranged therein around a respective transformer core branch can be 3 m or greater having a diameter of 2 m or greater. The term high-voltage winding can include within the scope of this disclosure electrical windings for a rated voltage starting from several kV ranging to several 100 kV, wherein power ranges starting from at least several MVA ranging to several 100 MVA and above can be covered. For example, winding blocks which are pre-mounted and which are composed of a plurality of windings can be covered by the term high-voltage winding. For example, a plurality of hollow-cylindrical windings of various diameters can be arranged radially one in the other or a plurality of windings with the same or a similar diameter can be arranged axially one behind the other.

Transformers of this size class can be custom made items whose transportation from the transformer works to the end customer and back can involve logistical issues. In the case of reworking of transformers, for example in the case of repair works in situ, one or more high-voltage windings on an existing transformer may be replaced directly at the customer's premises. The transportation of the entire transformer from the customer into the transformer works and back is avoided and the repair or the reworking can take place more quickly. However, the new high-voltage windings or pre-mounted winding blocks are transported from the transformer works to the customer.

Such transportation may also be needed, for example, if, owing to an unequal capacity utilization at a number of transformer works of the same manufacturer structurally identical high-voltage windings or pre-mounted winding blocks are fabricated in different works. For example, in the case where the high-voltage windings have to be taken to the assembly site of the high-voltage transformer.

The high-voltage winding or a premounted winding block according to the known systems are transported in an upright position, wherein the winding or the winding axis thereof is oriented vertically since the fabricated high-voltage windings may not have sufficient mechanical stability to be able to be tilted. Breakage or at least deformation is not a desirable result. A vertical high-voltage winding, which is also transported with an upright orientation can also cause logistical expenditure on transportation in that given a height of for example, 5 m, transportation profiles, for example, for transportation by railroad or by truck, may be exceeded.

In accordance with an exemplary embodiment, a device is disclosed, which allows simplified transportation of a high-voltage winding and/or of a pre-mounted winding block.

SUMMARY

A winding fixing device is disclosed for a hollow-cylindrical high-voltage winding, the winding fixing device comprising: a pillar-like element having two axial ends, each of the two axial ends configured to be connected to a respective retaining element which is arranged transversely with respect thereto, wherein each of the retaining elements is configured to be movable along the pillar-like element and detachable therefrom; a positioning region for arranging the hollow-cylindrical high-voltage winding, which is to be formed between the retaining elements; and spacing elements configured to move axially along the pillar-like element, wherein the spacing elements are configured to radially fix the hollow-cylindrical high-voltage winding when placed between the retaining elements by applying a tensile force to the retaining elements.

A method for fixing a hollow-cylindrical high-voltage winding in a winding fixing device, the method comprising: horizontally arranging a first plate-like retaining element on a horizontal working surface; positioning a pillar-like element in a vertical position and connecting the pillar-like element to the first plate-like retaining element; arranging at least one lower bearing element on the first plate-like retaining element; arranging spacing elements along the pillar-like element; arranging a hollow-cylindrical high-voltage winding in a positioning region and radially fixing the hollow-cylindrical high-voltage winding in the positioning region; arranging at least one upper bearing element on the hollow-cylindrical high-voltage winding; arranging a second plate-like retaining element in a horizontal position above the at least one upper bearing element; applying an axial tensile force between the retaining elements; and tilting the winding fixing device into a horizontal transportation position.

BRIEF DESCRIPTION OF THE DRAWINGS

In the following, exemplary embodiments will be described in greater detail with reference to the attached drawings, in which.

DETAILED DESCRIPTION

Figure 1:
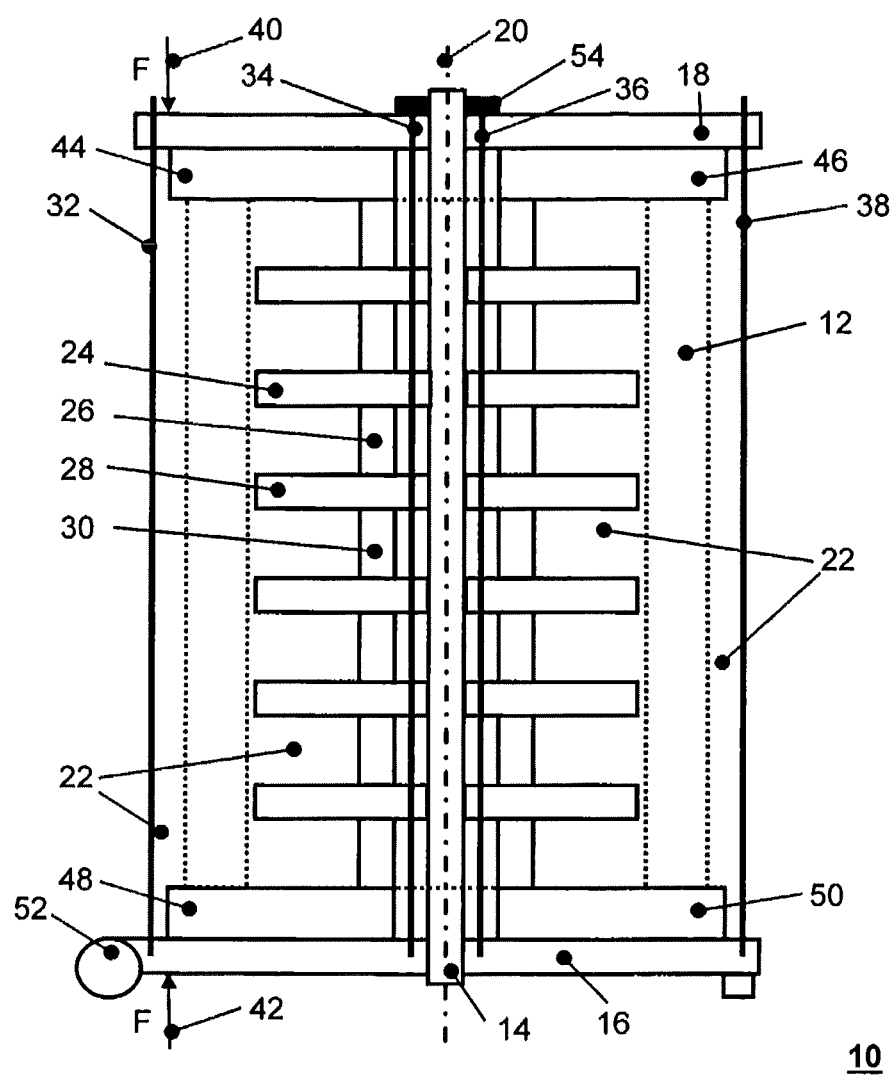
FIG. 1 shows a section through an exemplary first winding fixing device.

A winding fixing device is disclosed, wherein in the positioning region spacing elements which can move axially along the pillar-like element, and by which radial fixing of the hollow-cylindrical high-voltage winding in the interior thereof, in order to apply a tensile force to the at least one movable retaining element with respect to the other retaining element, with the result that fixing of the hollow-cylindrical high-voltage winding at its axial ends. The spacing elements are no longer movable if a winding or a winding block can be arranged and fixed in the winding fixing device. In accordance with an exemplary embodiment, a plurality of spacing elements can be premounted to form a unit, which can then be mounted when the winding is fixed.

In accordance with an exemplary embodiment, a winding fixing device can permit a high-voltage winding arranged therein or a pre-mounted winding block to be fixed and stabilized in such a way that the high-voltage winding or the pre-mounted winding block can be transported in a lying fashion. In accordance with an exemplary embodiment, the dimension which can be important for transportation in the case of a high-voltage winding is specifically the length thereof which can exceed the transportation profile which is predefined, for example, by the dimensions of trucks or railroad wagons. The dimensions, for example, can be at maximum 2.8 m in width and 4 m in height, depending on the selected means of transportation. The maximum transportable length in the case of a truck or in the case of a railroad wagon can be in excess of 10 m. A high-voltage winding with a base area of, for example, 2.5 m×2.5 m and a height of 5 m in a lying form can therefore be transported in one of the specified standard transportation means.

In accordance with an exemplary embodiment, in order to achieve stabilization of a high-voltage winding which is to be transported, a compressive force can be applied to the two axial ends of the high-voltage winding via the retaining devices and corresponding means, with the result that the stability of the high-voltage winding is increased. A high-voltage winding can be loaded with a pressure, but it can only take up a tensile force to a very limited extent. Insofar as the application of a permanent compressive force between the two axial ends occurs via means to which a tensile force can be applied, such as, for example, a traction rod or a cable, these means also serve to ensure that a tensile force which is applied between the axial ends, for example during a tilting process of the high-voltage winding which is located in the winding fixing device, can be kept away from the high-voltage winding.

In order to achieve further fixing of the high-voltage winding and, for example, to prevent bending during a tilting process, the disclosure also provides that the hollow-cylindrical high-voltage winding can be fixed radially in its internal region. In accordance with an exemplary embodiment, this can occur by means of spacing elements which at least in the case of a high-voltage winding which is not yet fixed, can be arranged so as to be movable along the pillar-like element, which can be embodied, for example, as a supporting tube. In accordance with an exemplary embodiment, the spacing elements can be mounted directly as separate and therefore movable components. For example, the spacing elements can be embodied similarly to rings or disks and can have a central hole through which the pillar-like element then engages. In accordance with an exemplary embodiment, the spacing elements can easily be stacked one on top of the other in a way which is guided by the pillar-like element. The diameter of the respective holes of the spacing elements can be adapted to the diameter of the pillar-like element or of the supporting tube with the result that radial slipping can be precluded.

The external diameter of at least a number of spacing elements can be adapted to the internal diameter of a hollow-cylindrical high-voltage winding which can be respectively fixed in the winding fixing device. In accordance with an exemplary embodiment, the pillar-like element can have a large diameter or a high degree of stability for taking up radial forces, for example through an embodiment as a supporting tube made of stainless steel with an external diameter of, for example, 20 cm. In accordance with an exemplary embodiment, deformation of a high-voltage winding in a direction transversely with respect to the pillar-like element can occur, for example in the case of a tilting process of the high-voltage winding which can be arranged in the winding fixing device, can be absorbed or prevented by means of the spacing elements and the pillar-like element.

In order to permit the spacing elements and also a high-voltage winding to be arranged around the pillar-like element, the disclosure provides that at least one retaining element, for example, the upper one, can be designed to be detachable from the pillar-like element. The components which are to be arranged can then be inserted from above. For example, in order to make the winding fixing device also suitable for various high-voltage winding heights, the upper retaining element can also be made movable along the pillar-like element.

In accordance with an exemplary embodiment, the winding fixing device according to the disclosure can fix a high-voltage winding and stabilize it in such a way that the latter can be reliably tilted into a horizontal position and transported in the position without a risk of damage.

In accordance with an exemplary embodiment, the winding fixing device according to the disclosure, at least one retaining element can be embodied in a plate-like fashion, for example as a metal plate, which can be applied to a sandwich construction made of metal, for example by means of welding. A planar standing surface or support surface of the axial ends of the winding to be fixed can be made as a result, of which winding can be additionally distinguished by a high level of stability and low weight.

In accordance with an exemplary embodiment, the winding fixing device can include at least one bearing element, which can be provided on the side of the respective retaining element which faces the positioning region. The bearing elements may have, for example in the case of a respectively constant height, a footprint which can be triangular or like a piece of cake, and the bearing elements can be provided as, under certain circumstances, infinitely resilient or at least not completely rigid buffer element between the bearing element and a coil which is to be fixed. For example, a plurality of bearing elements of the same type can be arranged in the manner of a ring about the pillar-like element. In accordance with an exemplary embodiment, the bearing elements can be used to avoid damage to a high-voltage winding to be fixed, for example, when a compressive force is applied between the retaining elements.

In accordance with an exemplary embodiment, for example, wood can be suitable as a material for the bearing elements and/or spacing elements. For example, wood can be easy to work with and can have a high level of stability under compression, but also has a certain degree of resilience, which can avoid damage to a high-voltage winding which can be arranged thereon, for example. In accordance with an exemplary embodiment, medium-density fiberboards (MDF), press boards or boards made of a similar material can also be used. In an exemplary embodiment, for example, for reasons of stability, the retaining elements and/or the pillar-like element can be fabricated from a metal.

In accordance with an exemplary embodiment, the winding fixing device can be provided with traction rods or traction cables in order to apply the tensile force between the retaining elements or to apply a pressure to the high-voltage winding to be fixed. The retaining elements can be fabricated from a metal and can have a high level of loadability in the tensile direction. For example, this can be a mechanical property which a high-voltage winding to be fixed does not have. For this reason, such traction rods or traction cables can be, for example, suitable for keeping tensile forces away from a winding arranged in the winding fixing device.

In accordance with an exemplary embodiment, the traction rods or traction cables can be provided with a thread at least at one of their two ends, which permits, for example, flexible mounting on a respective retaining element by virtue of the fact that the thread-side end of the respective traction rod or of the respective traction cable can be screwed into a correspondingly provided thread pitch in the respective plate-like retaining element. In addition, a thread can also permit flexible adjustment or longitudinal adjustment of the traction rods or traction cables. For example, the thread can be desirable when there are a wide variety of high-voltage windings to be arranged in the winding fixing device.

In accordance with an exemplary embodiment, the retaining elements can have a rectangular-like footprint, wherein at least four external traction rods can be provided in the external corner regions of the retaining element, and at least four internal traction rods can be provided in the region around the pillar-like element. A rectangular-like footprint, for example, a square footprint, can be matched to the usually circular footprint of a high-voltage winding. In accordance with an exemplary embodiment, at least one, for example, two respective external traction rods or traction cables can be arranged in the four external corner regions not covered by the high-voltage winding. Accordingly, in the region around the pillar-like element, for example, the region which corresponds to the interior of the high-voltage winding when the latter can be arranged, likewise at least four parallel traction rods or traction cables can be arranged, for example, at an angle of 90° with respect to one another. In addition, the traction rods or traction cables can also be arranged in pairs, for example, eight traction rods or traction cables for the corner regions or the internal region can be used. For example, in the respective retaining elements, corresponding connecting devices for traction cables or traction rods, for example corresponding thread drilled holes, can be provided at a plurality of distance radii with respect to the pillar-like element, which permits the use of the same winding fixing device for various diameters of respective high-voltage coils to be fixed.

The rectangular-like footprint of the retaining elements can be adapted to the cavity profile of preferred means of transportation, for example, railroad wagons and trucks. In accordance with an exemplary embodiment, the footprint can be approximately 2.8 m in width, for example, 2.5 m in width, for road transportation, and approximately 4 m in height. In accordance with an exemplary embodiment, there would also be no advantage for transportation if a relatively small winding fixing device were to be used when a relatively small high-voltage winding is to be transported.

In accordance with an exemplary embodiment, at least one spacing element with a first base surface can be arranged along the pillar-like element between two spacing elements with a protruding second base surface. The background of the alternating arrangement of wide and narrow spacing elements is that the large spacing elements can be adapted to the internal radius of a high-voltage winding to be fixed, for example, they can serve to radially fix the latter directly. Since such fixing can be sufficient at specific distance intervals, according to the disclosure the narrow spacing elements may only be necessary as spacer elements for maintaining the distance intervals, for example 50 cm in each case. In accordance with an exemplary embodiment, the use of material and the complexity of mounting can therefore be considerably reduced.

In accordance with an exemplary embodiment, a tilting device, for example a hinge which can be connected to a working surface, or else a rolling edge, can be provided, on one side of a retaining element. For example, a structure which can be mounted in a vertical position and can have a winding fixing device and high-voltage winding fixed therein to be moved into a horizontal transportation position.

In accordance with an exemplary embodiment, the winding fixing device according to the disclosure can include a hollow-cylindrical high-voltage winding which can be fixed or stabilized therein.

In accordance with an exemplary embodiment, the winding fixing device according to the disclosure, clamping elements, for example wedges, can also be used for radial fixing in addition to spacing elements arranged on the inner radius of the hollow-cylindrical winding. This permits, for example, arrangement of spacing elements in the interior of the hollow-cylindrical winding since the spacing elements can then selectively have a somewhat smaller diameter than the internal diameter of the hollow-cylindrical winding. A final fixing can then be carried out by means of wedges, which can compensate for fabrication tolerances.

In accordance with an exemplary embodiment of the disclosure, the winding fixing device can be surrounded, at least in its positioning region, by a diaphragm which runs around axially and which can also be embodied in a segmented fashion, wherein as a result a closed-off interior is formed. The diaphragm can be fabricated, for example, from a plastic film, for example, from polyethylene. In accordance with an exemplary embodiment, the high-voltage winding can cope with the stresses of transportation, for example transportation of sea without a container as bulk material without taking up moisture and without damage. The film can serve to protect against moisture, wherein the mechanical protection can be secured at the axial ends by the plate-like retaining elements, and in the corner elements between the retaining elements by the traction rods arranged in the corner regions. The winding fixing device, for example, can have external dimensions similar to those of a standard container, with the result that the latter can be transported by means of existing transportation systems such as railroad wagons or trucks.

In accordance with an exemplary embodiment, the winding fixing device can be arranged, together with a high-voltage winding fixed by it, in a lying position in a standardized transportation container, for example a 20 foot or 40 foot standard container. In accordance with an exemplary embodiment, this can permit further integration into existing transportation systems, for example, a container ship, in which a multiplicity of standard containers can be stacked.

In accordance with an exemplary embodiment, a method for fixing a hollow-cylindrical high-voltage winding in a winding fixing device according to the disclosure is disclosed, including at least the following steps: horizontally arranging a first plate-like retaining element on a horizontal working surface; positioning a pillar-like element in a vertical position and connecting to the first plate-like retaining element; arranging at least one lower bearing element on the first plate-like retaining element; arranging spacing elements along the pillar-like element; moving up a hollow-cylindrical high-voltage winding; radial fixing of the hollow-cylindrical high-voltage winding; arranging at least one upper bearing element on the hollow-cylindrical high-voltage winding; arranging a second plate-like retaining element in a horizontal position above the at least one upper bearing element; applying an axial tensile force between the retaining elements, and tilting the winding fixing device into a horizontal transportation position.

For example, in accordance with an exemplary embodiment, the steps of fixing drying materials such as silica gel and mounting a frame device with a film diaphragm can be achieved. For example, the interior which has been produced in this way and in which the high-voltage winding can be protected against moisture effects, for example, in the case of transportation by sea.

In accordance with an exemplary embodiment, the sequence of working steps does not necessarily have to be in this specified order. For example, it can depend on feasibility, for example, the arrangement of the spacing elements may then take place once the pillar-like element has been arranged.

FIG. 1 shows a section through a first winding fixing device 10. As shown in FIG. 1, at the two axial ends of a pillar-like element 14 a supporting tube made of metal with a length of several meters, and a lower retaining element 16 and an upper retaining element 18 are arranged. Between them, a positioning region 22 for fixing a high-voltage winding can be embodied, which high-voltage winding is indicated by dashed lines with the reference number 12 as a hollow cylinder which extends in a rotationally symmetrical fashion around the one axis 20 of extent. The latter at the same time also characterizes the axial profile of the supporting tube 14. The retaining element 16 can be embodied as a plate-like sandwich structure made of metal and has a base surface of approximately 2.8 m×2.8 m, wherein on the left-hand side in the figure a rolling device 52 is provided around which the winding fixing device 10 or a high-voltage winding 12 fixed therein can be tilted from a vertical mounting position into a horizontal transportation position.

On the lower retaining element, a plurality of wooden bearing elements 48, 50 can be arranged in a ring-like fashion around the axis 20 of extent. The latter can have an approximately equal height, for example 20 cm, and can serve to protect a high-voltage winding 12 supported thereon against any damage, for example, due to excessively high punctual pressure loading. In accordance with an exemplary embodiment, depressions can be adapted to the shape of the bearing elements 48, 50 and can be provided in the plate-like retaining element 16 in order to prevent lateral slipping or incorrect positioning thereof. In accordance with an exemplary embodiment, the bearing elements 48, 50 can be permanently fixed on the retaining element 16, for example by means of bonding.

Arranged along the pillar-like element 14 are, in an alternating sequence, spacing elements 24, 28 which can have a relatively large cross section which can be adapted to the internal diameter of a winding to be fixed, and spacing elements 26, 30 with a smaller cross section, wherein the latter serve ultimately only for axially spacing apart the other spacing elements 24, 28 with a relatively large cross section. The spacing elements 24, 28 can have in their center a hole, which can be adapted to the diameter of the pillar-like element 14, such that lateral displacement in the transverse direction with respect to the axis 20 of extent can be ruled out. Lateral displacement of a high-voltage winding 12 with corresponding internal diameter can also be ruled out. The spacing elements 24, 26, 28, 30 can be stacked loosely and are not connected to one another.

The upper retaining element 18 can be, with the exception of a tilting device which is not present, embodied approximately analogously to the lower retaining element 16, wherein the connection to the upper axial end of the pillar-like element 14 can be displaced, for example, not screwed. For example, the upper retaining element 18 can be completely released and removed, which can provide access from above to the positioning region 22. According to the lower retaining element 16, bearing elements 44, 46 can be provided between the upper retaining element 18 and the positioning region.

For example, in order to fix or stabilize further a high-voltage winding which can be arranged between the bearing elements 44, 46, 48, 50, means are provided for applying a tensile force 40↔42 between the retaining elements 16, 18, for example, traction rods 32, 34, 36, 38, which can be provided with a thread on both sides. Corresponding thread pitches can be provided in the retaining elements 16, 18, which can include an adjustable frictionally locking connection. In accordance with an exemplary embodiment, other frictionally locking connections can also be used, for example a continuous hole in one of the retaining elements and a traction cable with a corresponding thickened portion at one of its two ends. If the retaining cable is guided with its non-thickened end through the continuous hole, the thickened end can be prevented from slipping through the continuous hole, and therefore a frictionally locking connection can also be brought about.

In accordance with an exemplary embodiment, a tensile force 40↔42 of the traction rods 32, 34, 36, 38, can bring about compression or a compressive force on a high-voltage winding which can be arranged between the retaining elements, with the result that the latter is thereby stabilized and can also be tilted into a horizontal position together with the winding fixing device without mechanical deformation. For example, in order to fix the upper retaining element 18, a screwed connection 54 can be provided at the upper axial end of the pillar-like element 20.

Figure 2:
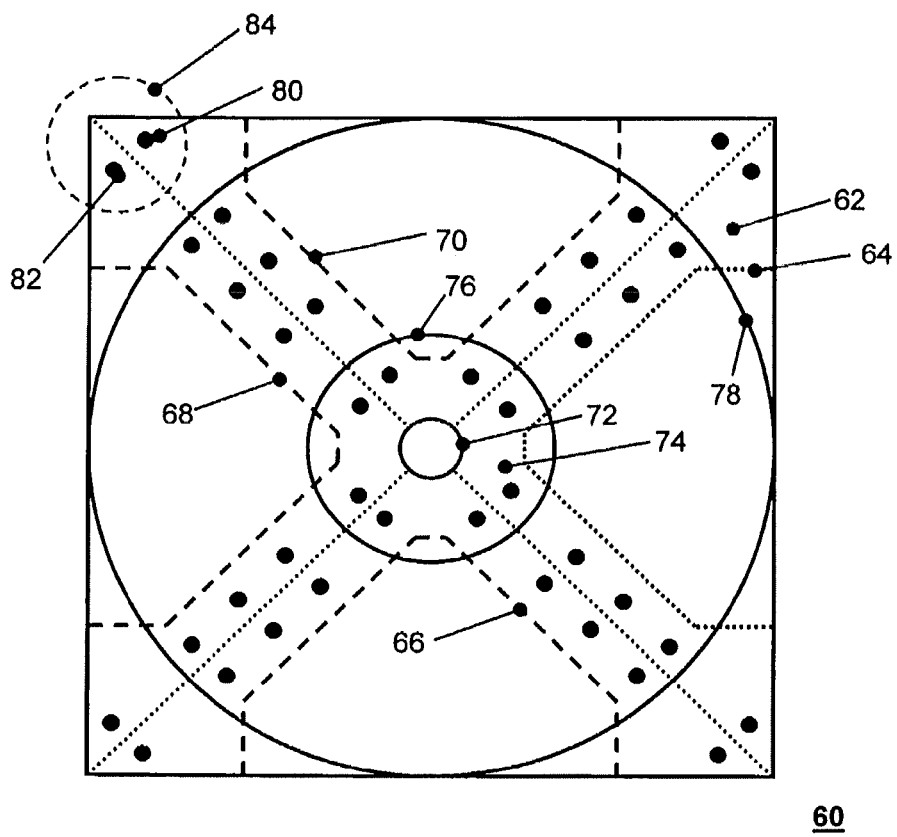
FIG. 2 shows a plan view of an exemplary retaining element.

FIG. 2 shows a plan view 60 of an exemplary retaining element 62 with a square footprint. Threaded holes 80, 82, which can serve to accommodate traction rods with corresponding threads, can be provided in pairs at various distance radii with respect to the center point along two virtual lines running between respective corner points 84 of the footprint. The threaded holes 80, 82 with the distance radii which match them can be selected in accordance with the diameter of a high-voltage winding to be accommodated. In accordance with an exemplary embodiment, the radially outer threaded holes can project beyond the external radius of a high-voltage winding which can be arranged on the retaining element 62, with the result that the threaded holes can also constitute a mechanical protection for the high-voltage winding. The trapezium-like base surfaces of four bearing elements 64, 66, 68, 70, which can be arranged in the form of a ring around the center point of the square retaining element 62, are indicated by a dashed line. A pillar-like element 72 can be arranged perpendicularly with respect to the retaining element 62, in the center point thereof. In the internal region 74 around the pillar-like element 72, a total of eight internal threaded drilled holes can be provided, into which threaded drilled holes can screw traction rods which then run in the internal region of a hollow-cylindrical high-voltage winding which can be arranged on the retaining element 62. A high-voltage winding can then be clamped together with for example, eight further traction rods which can be provided radially on the outside, by means of a total of 16 traction rods or else traction cables. The base surface of the positioning region for an arrangement of high-voltage windings is indicated by a circle with the reference number 78, wherein the circle with the reference number 76 represents the base surface which is provided for the interior of a high-voltage winding.

Figure 3:
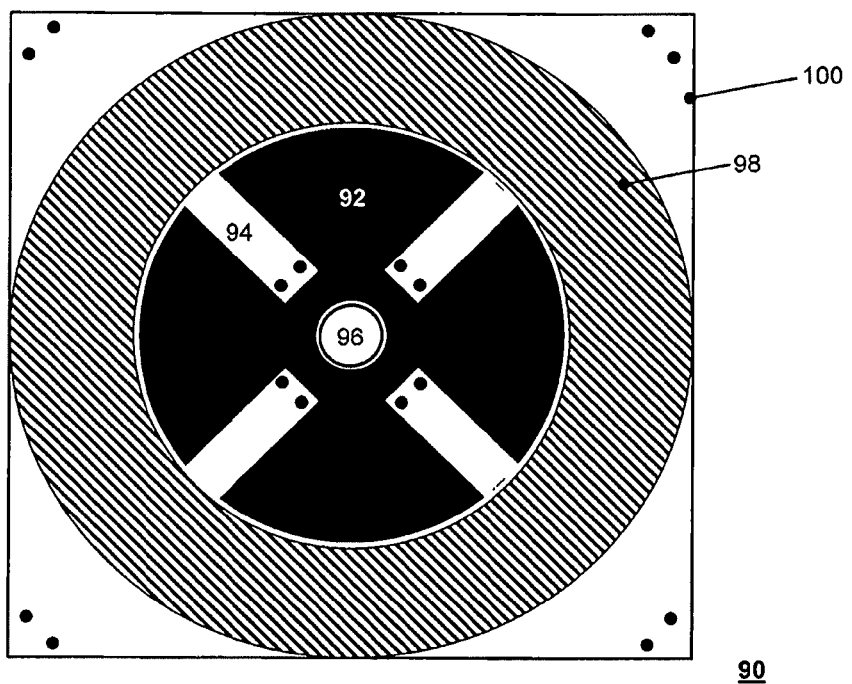
FIG. 3 shows a section through an exemplary second winding fixing device of the winding.

FIG. 3 shows a section 90 through a second winding fixing device with a high-voltage winding 98. In accordance with an exemplary embodiment, two traction rods with their cross section are illustrated in the corner regions of the winding fixing device, which traction rods can constitute a mechanical protection for the high-voltage winding 98 in the internal region of which a spacing element 92 which is matched to the cross section of the high-voltage winding 98 is shown. The spacing element 92 can have a total of four slots 94 through which internal traction rods, also indicated by their cross section, are guided. Arranged along the center axis of the high-voltage winding can be a pillar-like element 96 which can be guided through a corresponding drilled hole through the spacing element 92. A diaphragm, which surrounds the corresponding positioning region, is indicated congruently with the outer edges of the square base surface of the winding fixing device with the reference number 100. Such a diaphragm prevents, for example in the case of transportation by sea, penetration of moisture into the high-voltage winding to be transported, in that the diaphragm brings about an equalization of pressure between the internal pressure and the external pressure by volume adaptation, and thereby preventing an exchange between the dry internal air through the moist external air.

Figure 4:
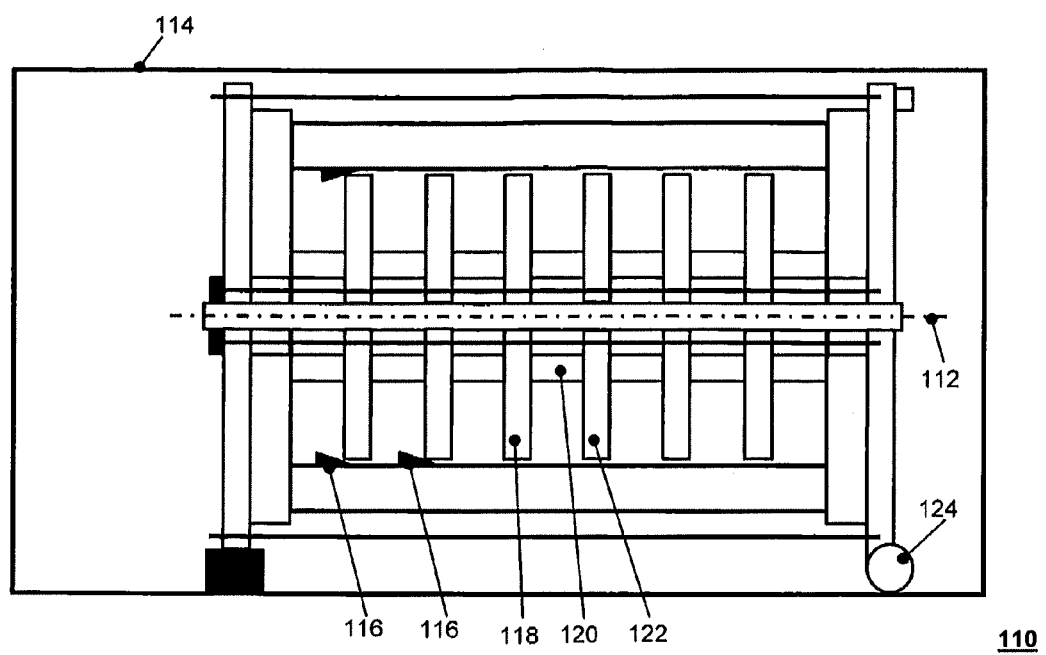
FIG. 4 shows a section through a lying exemplary winding fixing device.

FIG. 4 shows a section 110 through a lying winding fixing device with a high-voltage winding which can be fixed therein and which corresponds approximately to the winding fixing device shown in FIG. 1. The orientation indicated with the line with the reference number 112 can therefore be horizontal. The device can be arranged in a standard transportation container 114, with the result that it can be transported by rail, truck or else container ships. The tilting process of the device into the horizontal transportation position has taken place previously by means of the tilting device, for example, a rolling edge, indicated by the reference number 124. A radial support of the high-voltage winding is provided by spacing elements 118, 122 which can be adapted to the internal diameter of the high-voltage winding and can be secured with wedges 116 in order to rule out any movement play.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMBERS

10 Section through a first winding fixing device
12 Indicated hollow-cylindrical high-voltage winding
14 First pillar-like element
16 Lower retaining element
18 Upper retaining element
20 Vertical axial extent of the first winding fixing device
22 Positioning region
24 First spacing element of a first winding fixing device
26 Second spacing element of a first winding fixing device
28 Third spacing element of a first winding fixing device
30 Fourth spacing element of a first winding fixing device
32 First traction rod of a first winding fixing device
34 Second traction rod of a first winding fixing device
36 Third traction rod of a first winding fixing device
38 Fourth traction rod of a first winding fixing device
40 Force on the upper retaining element
42 Force on the lower retaining element
44 First bearing element of a first winding fixing device
46 Second bearing element of a first winding fixing device
48 Third bearing element of a first winding fixing device
50 Fourth bearing element of a first winding fixing device
52 First tilting device
54 Screwed connection
60 Plan view of an exemplary retaining element
62 Exemplary retaining element
64 First bearing element of exemplary retaining element
66 Second bearing element of exemplary retaining element
68 Third bearing element of exemplary retaining element
70 Fourth bearing element of exemplary retaining element
72 Second pillar-like element
74 Region around second pillar-like element
76 Internal base surface radius of positioning region
78 External base surface radius of positioning region
80 First threaded hole for traction rods
82 Second threaded hole for traction rods
84 External corner region
90 Section through second winding fixing device with winding
92 Spacing element
94 Slot
96 Third pillar-like element
98 High-voltage winding
100 Diaphragm
110 Section through a third winding fixing device in a container
112 Horizontal axial extent of the winding fixing device
114 Container
116 Clamping element
118 First spacing element of third winding fixing device
120 Second spacing element of third winding fixing device
122 Third spacing element of third winding fixing device
124 Second tilting device

What is claimed is:

1. A winding fixing device for a hollow-cylindrical high-voltage winding, the winding fixing device comprising:
  a pillar-like element having two axial ends, each of the two axial ends configured to be connected to a respective retaining element which is arranged transversely with respect thereto, wherein each of the retaining elements is configured to be movable along the pillar-like element and detachable therefrom;
  a positioning region for arranging the hollow-cylindrical high-voltage winding, which is to be formed between the retaining elements; and spacing elements configured to move axially along the pillar-like element, wherein the spacing elements are configured to radially fix the hollow-cylindrical high-voltage winding when placed between the retaining elements by applying a tensile force to the retaining elements, wherein at least one of the spacing elements has a first base surface, which is arranged along the pillar-like element between two spacing elements with a protruding second base surface.

2. The winding fixing device as claimed in claim 1, wherein at least one of the retaining elements is embodied in a plate-like fashion.

3. The winding fixing device as claimed in claim 1, comprising:
at least one bearing element, which is provided on a side of a respective retaining element which faces the positioning region.

4. The winding fixing device as claimed in claim 1, wherein the bearing elements and/or spacing elements are fabricated from wood.

5. The winding fixing device as claimed in claim 1, wherein the retaining elements and/or the pillar-like element are fabricated from a metal.

6. The winding fixing device as claimed in claim 1, comprising:
traction rods or traction cables configured to apply the tensile force between the retaining elements.

7. The winding fixing device as claimed in claim 6, wherein the traction rods or traction cables are provided with a thread on at least one end.

8. The winding fixing device as claimed in claim 6, wherein the retaining elements have a rectangular-like footprint, and the traction rods or traction cables comprises:
at least four external traction rods provided in external corner regions and at least four internal traction rods provided in a region around the pillar-like element.

9. The winding fixing device as claimed in claim 1, comprising:
a diaphragm, wherein the positioning region is at least axially surrounded by the diaphragm.

10. A winding fixing device in combination with a hollow-cylindrical high-voltage winding, the winding fixing device comprising:
a pillar-like element having two axial ends, each of the two axial ends configured to be connected to a respective retaining element which is arranged transversely with respect thereto, wherein each of the retaining elements is configured to be movable along the pillar-like element and detachable therefrom;
a positioning region for arranging the hollow-cylindrical high-voltage winding, which is to be formed between the retaining elements;
spacing elements configured to move axially along the pillar-like element, wherein the spacing elements are configured to radially fix the hollow-cylindrical high-voltage winding when placed between the retaining elements by applying a tensile force to the retaining elements; and
clamping elements, which in combination with the spacing elements are arranged on an inner radius of the hollow-cylindrical high-voltage winding.

11. The winding fixing device as claimed in claim 10, wherein the clamping elements are wedges.

12. The winding fixing device as claimed in claim 10, wherein the winding fixing device is arranged in a lying position in a transportation container.

* * * * *